(12) United States Patent
Yoon et al.

(10) Patent No.: US 8,743,278 B2
(45) Date of Patent: Jun. 3, 2014

(54) PORTABLE MAGNIFYING APPARATUS HAVING MULTI ANGULAR POSITIONED HANDLE

(75) Inventors: Yang Taik Yoon, Daejeon (KR); Kyeong Seon Choi, Daejeon (KR); Sang Jun Lee, Daejeon (KR); Wock Lyul Lee, Daejeon (KR); Il Hyung Kim, Daejeon (KR)

(73) Assignee: HIMS International Corporation, Daejeon (KR)

( * ) Notice: Subject to any disclaimer, the term of this patent is extended or adjusted under 35 U.S.C. 154(b) by 1 day.

(21) Appl. No.: 13/547,089

(22) Filed: Jul. 12, 2012

(65) Prior Publication Data

US 2013/0208161 A1 Aug. 15, 2013

(30) Foreign Application Priority Data

Feb. 15, 2012 (KR) .......................... 10-2012-0015473

(51) Int. Cl.
*H04N 5/225* (2006.01)
(52) U.S. Cl.
USPC .......................................... 348/373; 348/376
(58) Field of Classification Search
None
See application file for complete search history.

(56) References Cited

U.S. PATENT DOCUMENTS

| D256,469 | S | * | 8/1980 | Stemme et al. | D16/206 |
|---|---|---|---|---|---|
| 5,107,287 | A | * | 4/1992 | Swayze | 396/424 |
| D502,200 | S | * | 2/2005 | Abe | D16/206 |
| 6,956,616 | B2 | * | 10/2005 | Jung et al. | 348/376 |
| 2006/0072033 | A1 | * | 4/2006 | Oran | 348/376 |
| 2010/0026854 | A1 | * | 2/2010 | Rodriguez et al. | 348/240.99 |
| 2010/0073545 | A1 | * | 3/2010 | Rodriquez et al. | 348/333.12 |
| 2011/0026081 | A1 | * | 2/2011 | Hamada et al. | 358/1.18 |
| 2013/0021523 | A1 | * | 1/2013 | Chuang | 348/376 |

FOREIGN PATENT DOCUMENTS

| KR | 20-1999-0025963 U | 7/1999 |
|---|---|---|
| KR | 20-1999-0037024 U | 10/1999 |
| KR | 10-2005-0003219 A | 1/2005 |
| KR | 10-2007-0054569 A | 5/2007 |

* cited by examiner

*Primary Examiner* — Twyler Haskins
*Assistant Examiner* — Angel L Garces-Rivera
(74) *Attorney, Agent, or Firm* — The Webb Law Firm (57) ABSTRACT

Provided is a portable magnifying apparatus that can be easily carried around. More particularly, provided is a portable magnifying apparatus which is conveniently used for users either left-handed or right-handed and has a multi angular positioned handle that can be manipulated without putting strain on the wrist.

5 Claims, 6 Drawing Sheets

PORTABLE MAGNIFYING APPARATUS HAVING MULTI ANGULAR POSITIONED HANDLE

CROSS-REFERENCE TO RELATED APPLICATIONS

This application claims priority under 35 U.S.C. §119 to Korean Patent Application No. 10-2012-0015473, filed on Feb. 2, 2012, in the Korean Intellectual Property Office, the disclosure of which is incorporated herein by reference in its entirety.

TECHNICAL FIELD

The following disclosure relates to a portable magnifying apparatus that can be easily carried around. More particularly, the following disclosure relates to a portable magnifying apparatus which is conveniently used for users either left-handed or right-handed and has a multi angular positioned handle that can be manipulated without putting strain on the wrist.

BACKGROUND

In general, the visually impaired refers to those who have lost their eyesight due to various eye diseases and lost light sense in which they cannot discriminate between light and shadow, but also includes a person who can barely discriminate between light and shadow and has severely weak eyesight in which only a motion of a hand before his eyes can be recognized may also be classified as visually impaired. People who have low vision, accounting for the largest percentage of the visually impaired, cannot recognize a subject such as characters, figures, or the like, with general glasses or lenses due to the weakened eye lens, iris, retina, and visual nerve system.

A magnifying apparatus is an apparatus for magnifying an image of a subject such as a book, a medicine bottle, a check, a bill (or a note), or the like, having small letters in order to help people who have low vision, or the elderly.

In particular, a portable magnifying apparatus that is small and light, can be carried around, and simply manipulated is preferred. Such a portable magnifying apparatus is divided into a support-type magnifier and a handle-type magnifier.

The support-type magnifier includes a support under a body thereof, so a user may unfold the support and lay it on the ground to use it or have the body held by hands in order to use it. In case of the handle-type magnifier, the user may unfold a handle thereof and hold it with his hands to use it.

The support-type magnifier does not have a handle, so when the user wants to use it, the user should hold the body thereof in his/her hands. Thus, it is inconvenient for a person who has a handicapped hand, for example, does not have a thumb or an index finger to hold and use the support-type magnifier. Also, when the user wants to scale down to view the target, the user should hold the body of the support-type magnifier to view the target, and when the user wants to scale up to view the target, the user should simply magnify the original image through digital zooming, and in this case, picture quality is degraded. In addition, in case of using illumination of the magnifier, if the user moves away from the subject, picture quality is damaged due to influence of the illumination.

The handle-type magnifier is convenient to hold and use with hands, but when it is intended to be laid on the ground to be used, the center of gravity of the magnifier is not uniform such that the weight distribution causes it to wobble. Also, since a battery is embedded in the body of the handle-type magnifier, the center of gravity shifts toward the body, causing the handle-type magnifier to feel heavy when the user holds it with his/her hands. Also, in case of a general handle-type magnifier, since the handle and the body are positioned in a straight line, when the user wants to use the magnifier at an angle at which his eyes are most comfortable, he should twist his wrist to use the magnifier. Thus, when the handle-type magnifier is used for a long period of time, the user's wrist is strained. Namely, the handle-type magnifier has a limitation for a person having a weak wrist such as a carpal tunnel syndrome.

Also, the general handle-type magnifier employs a fixed focus scheme, having a disadvantage in that when a subject is out of a limited range of distance, an image becomes unclear.

To solve the problem, a product employing an auto-focus scheme has been proposed. However, in this product, without a sensor for auto-focusing, images obtained through an image sensor are compared and analyzed to adjust the focus, having a disadvantage in which the focus is blurred due to handshaking when the user views a subject through the lens held in his hands. Also, in case in which letters of the subject are small, when sharpness and edge data are extracted for auto-focusing, the number of collected data is so small that the focus is blurred. In addition, since existing products are not accurate in sensing a distance for auto-focusing of a subject, a majority of products apply auto-focusing to a remote subject and fixed focusing to a nearby subject. Also, since they employ single auto-focusing (AF) scheme, namely, semi auto-focusing scheme, manual focusing should be performed in order to view a remote subject, causing user inconvenience alternating between a nearby subject and a remote subject.

Thus, in order to solve the problems, development of a handle-type magnifier which does not put strain on the wrist, has a lightweight body, and facilitates button manipulation, and further, a technique of a magnifying apparatus that does not allow illumination to affect picture quality, provide a sharp, clear image without a loss of picture quality with respect to the original image through a multi-step support when the magnifying apparatus is laid on the ground to be used, and allow focusing and illumination to be automatically adjusted is required.

SUMMARY

An embodiment of the present invention is directed to providing a portable magnifying apparatus having a handle adjustable at an angle in a direction parallel to a body and a support adjusting height in multiple stages, and employing an active auto-focusing scheme.

In one general aspect, a portable magnifying apparatus having a multi angular positioned handle includes: a body; a lens unit installed on a bottom surface of the body and focused to capture an image of a nearby subject or a remote subject; a CMOS sensor unit provided within the body and converting an image obtained through the lens unit into image data; an output unit installed on a top surface of the body, receiving the image data, and outputting the same; and a handle hinge-combined to the bottom surface of the body such that an angle thereof can be adjusted in a direction parallel to the body (or such that it can be adjusted in a horizontal direction of the body at various angles).

When the handle is folded to the body, the handle may be fixed to one side of the bottom surface of the body in a width direction, a first support having a height corresponding to a thickness of the handle may be provided at the other side of the body in the width direction, and the first support may be hinge-coupled to the body such that it is unfolded and folded.

The portable magnifying apparatus may have a second support hinge-coupled to the handle such that it is folded to or unfolded from a lower surface of the handle and a third support provided at the other side of the body in the width direction and having a height corresponding to the sum of the thickness of the handle and a height of the second support, and the third support may be hinge-coupled to the body such that it is unfolded or folded.

The portable magnifying apparatus may include a user interface (UI) unit provided at the other side of the body in the length direction and configured as a plurality of buttons for receiving a user input, wherein the UI unit may be provided to be sloped toward the handle at a certain angle from a top surface of the body.

The output unit may include: an image obtaining module loading image data transmitted from the CMOS sensor unit to a memory; a threshold value calculation unit extracting a maximum pixel luminance value and a minimum pixel luminance value through a luminance signal of the image data, and calculating a threshold value through the maximum pixel luminance value and the minimum pixel luminance value; a binarization unit generating a binarized image with respect to the image data on the basis of the threshold value; and a screen output unit outputting the binarized image.

The portable magnifying apparatus may include a battery for supplying power, and the battery may be embedded in the handle.

Other features and aspects will be apparent from the following detailed description, the drawings, and the claims.

DETAILED DESCRIPTION OF EMBODIMENTS

The advantages, features, and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

With reference to FIGS. 1 through 9, a magnifying apparatus 100 (or an image magnifying apparatus 100) according to an exemplary embodiment includes a body 100a, a lens unit 110, a CMOS sensor unit 115, a distance sensor unit 120, an output unit 130, an LED illumination unit 140, a user interface (UI) unit 150, a support 160, an arithmetic operation module 170, and a handle 200.

The body 100a is formed to have a space therein and has a rectangular container body-like shape having a thickness. In order to clarify the configuration, with reference to FIG. 3, a horizontal direction is defined to be a length direction, a vertical direction is defined to be a width direction, the side where the output unit 130 of the body 100a is disposed is defined to be a top side, and the side where the lens unit 110 is disposed is defined to be a bottom side. An input unit, which includes the lens unit 110, the distance sensor unit 120, and the LED illumination unit 140, and a handle capturing an image of a subject, is formed in the length direction at the center of the width direction on a bottom surface of the body 100a. The handle 200 is coupled to one side of the bottom surface of the body 100a in the width direction, and the support 160 is provided on a lower surface of the handle 200 and at the other side of the body 100a in the width direction. The output unit 130 displaying captured image of a subject is formed on a top surface of the body 100a, and the UI unit 150 is formed at the other side of the top surface of the body 100a in the length direction to provide convenience for user manipulation. Within the body 100a, the foregoing elements are connected, and a control circuit such as the CMS sensor unit 115 or the arithmetic operation module 170 may be installed. Since the magnifying apparatus 100 having the foregoing configuration includes the handle 200, the size of the body 100a may be larger than a user's hand.

Figure 1:
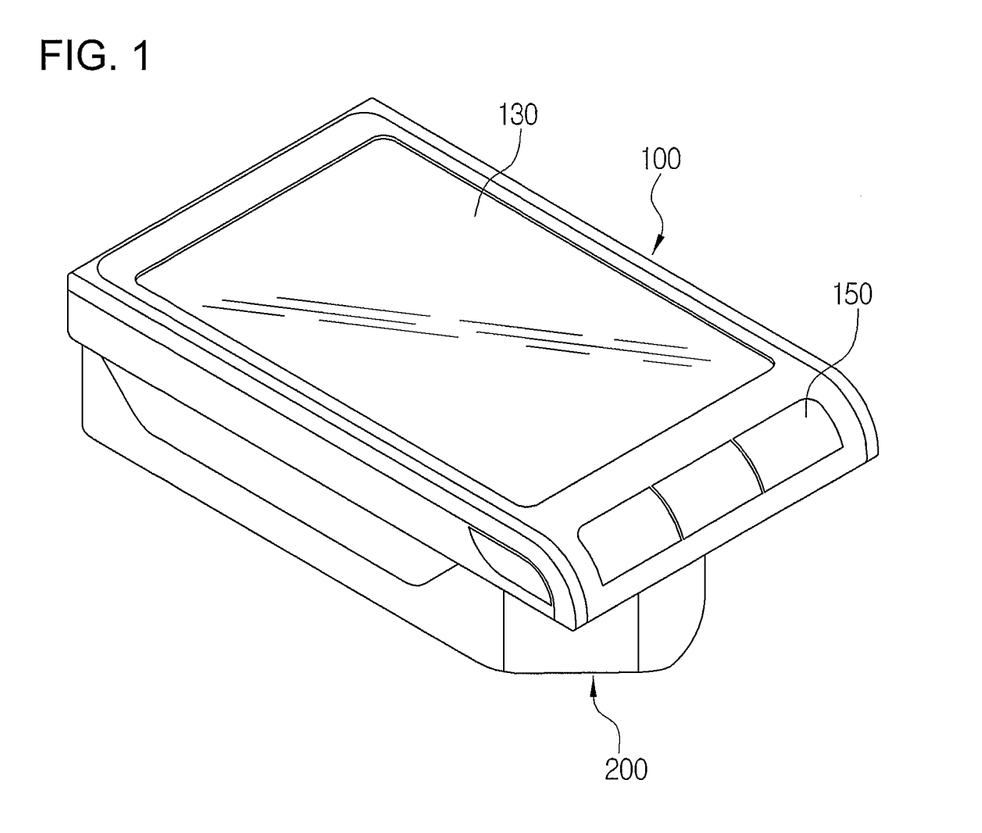
FIG. 1 is an overall perspective view of a magnifying apparatus according to an exemplary embodiment.
Figure 2:
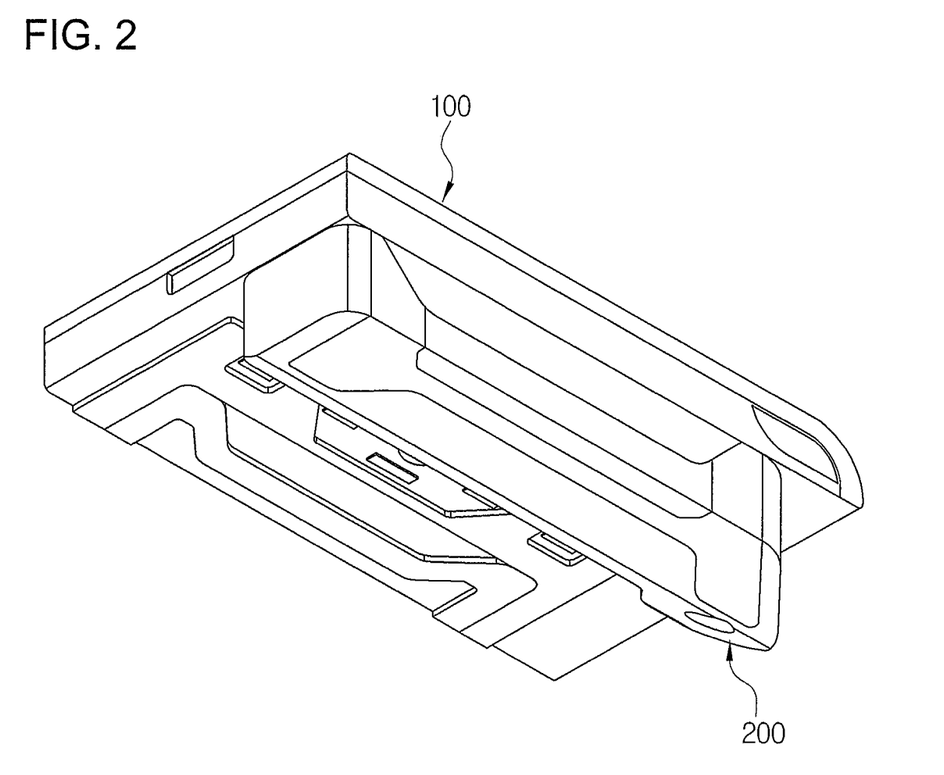
FIG. 2 is a bottom perspective view of the magnifying apparatus according to an exemplary embodiment.
Figure 3:
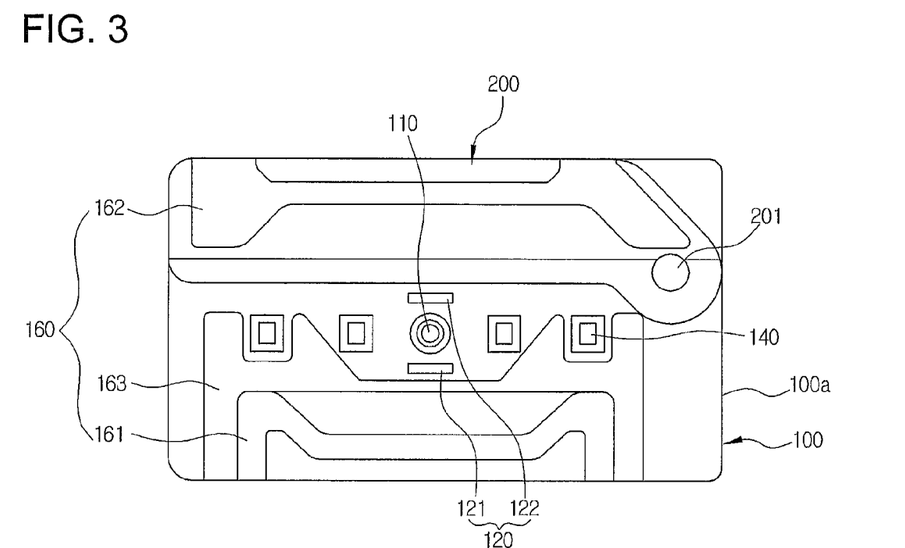
FIG. 3 is a bottom view of the magnifying apparatus according to an exemplary embodiment.

With reference to FIG. 3, the lens unit 110 may be installed at the center of the bottom surface of the body 100a to allow an image of a subject located immediately below the lens unit 110 or a remote subject. The lens unit 110 includes an auto-focus lens 111 and an auto-focus driver 112. The auto-focus lens 111 may be a liquid lens that can be focused for proximity (or close-up) image capturing or remote image capturing. The liquid lens is advantageous in that it is lighter than an existing auto-focus lens and consumes less current. The auto-focus driver 112 is formed within the body 100a and adjusts the focus of the auto-focus lens 111 under the control of the arithmetic operation module 170. As the auto-focus driver 112, a general configuration for adjusting the focus of a liquid lens is employed, so a detailed description thereof will be omitted. Through the foregoing configuration, the magnifying apparatus according to an exemplary embodiment can obtain an image of a nearby subject and an image of a remote subject.

The CMOS sensor unit 115 may be installed within the body 100a. The CMOS sensor unit 115 serves to change a physical signal obtained from the lens unit 110 into an electrical signal. Thus, the image obtained by the CMOS sensor unit 115 is converted into image data. For example, the image may be converted into image data to have a format such as SVGA (800*600), YUV422, 30f/s, Progressive, or the like, through the CMOS sensor unit 115.

The distance sensor unit 120 is disposed on one surface of the body 100a. The distance sensor unit 120 may be installed to be adjacent to the lens unit 110. The distance sensor unit 120 is configured to measure a distance to the subject and adjust the focus of the lens unit 110 through the arithmetic operation module 170. The distance sensor unit 120 includes a light emitting unit 121 irradiating infrared rays to a subject and a light receiving unit 122 sensing infrared rays reflected from the subject. As the light emitting unit 121, a general infrared LED may be employed. The intensity of infrared rays sensed by the light receiving unit 122 is transferred to the arithmetic operation module 170, and a distance to the subject is measured by the arithmetic operation module 170 and the focus of the lens unit 110 is controlled. Here, auto-focus values with respect to the subject and each distance are configured as a table and stored in the arithmetic operation module 170. The stored values are those obtained when the auto-focusing is set with respect to each distance and an image is the clearest, enhancing a processing speed in comparison to a manual auto-focusing method in which maximum values of sharpness and edges are searched while adjusting the lens unit 110 over the entire section of a focus length.

Figure 4:
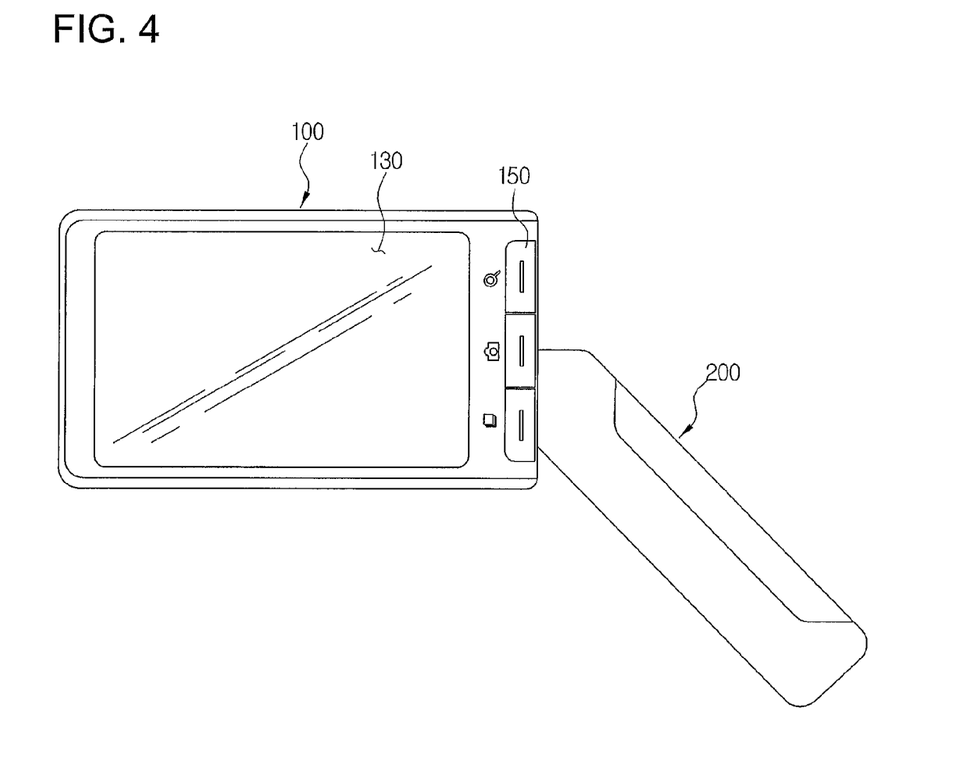
FIG. 4 is a view showing an operational state of a handle according to an exemplary embodiment (when held by a right hand)
Figure 5:
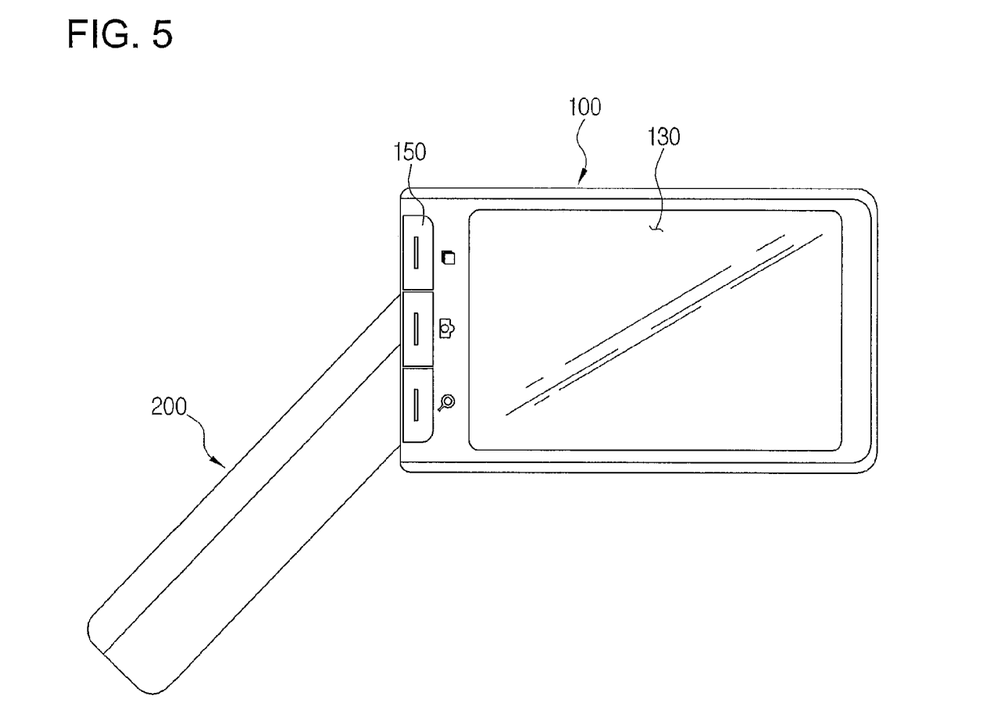
FIG. 5 is a view showing an operational state of a handle according to an exemplary embodiment (when held by a left hand)
Figure 6:
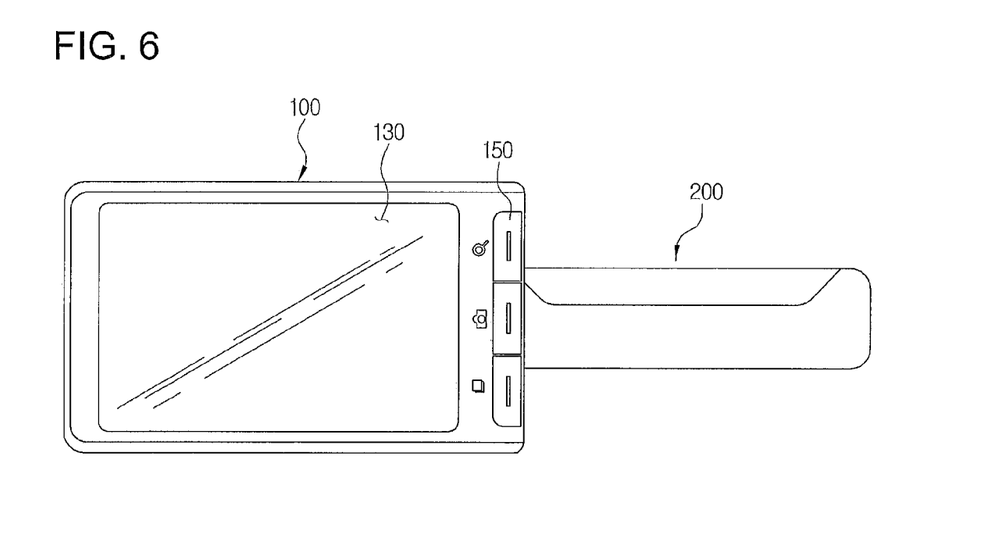
FIG. 6 is a view showing an operational state of a handle according to an exemplary embodiment (when both hands are commonly used)
Figure 7:
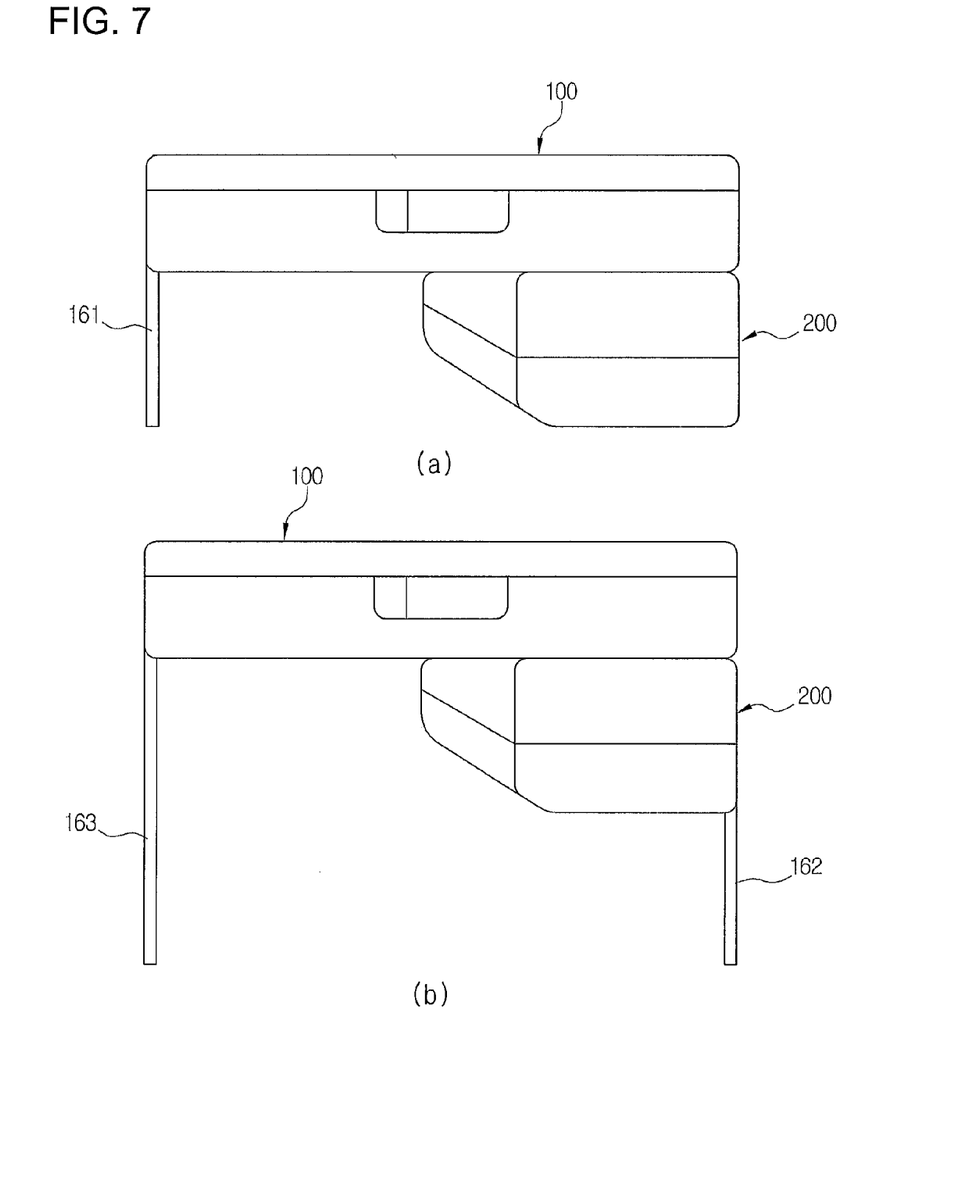
FIG. 7 is a view showing an operational state of a support according to an exemplary embodiment.

The handle 200 has a shape allowing the user to grasp it with one hand. A hinge coupling unit 201 is formed at one end portion of the handle 200 and the handle 200 is hinge-coupled to the other side of the body 100a in the length direction such that it is hinge-rotated in a direction parallel to the body 100a. Thus, when the handle 200 is folded, it is fixed in the length direction to one side of a bottom surface of the body 100a in the width direction. When the handle 200 is unfolded through hinge-rotation, the handle 200 may be deformed as follows according to a tilt thereof with respect to the body 100a. The handle 200 is adjusted at four-stage angles. In a first stage, the handle 100a is tightly attached to the bottom portion of the body 100a in a folded state and serves as a support as shown in FIG. 3. In a second stage, the handle 200 is disposed at an angle convenient for a left-hander as shown in FIG. 4. In a third stage, the handle 200 is maintained to be parallel to the body 100a at an angle such as that of a general handle type magnifier as shown in FIG. 6. In this stage, the handle 200 is at a level with the body 100a like a general magnifying glass. This state of the handle 200 is appropriate for a user who is familiar with an existing magnifying glass. In a fourth stage, the handle 200 is disposed at an angle convenient for a right-hander without causing strain to the wrist as shown in FIG. 5. Through the foregoing configuration, the handle 200 may be disposed at a position without causing strain to the wrist no matter whether the user uses his/her right or left hand, providing user convenience.

A battery (not shown) for supplying power to the magnifying apparatus 100 may be embedded in the handle 200. This is to distribute the weight to the handle 200 when the user grasps the handle 200 to use the magnifying apparatus 100 to thus make the user feel the magnifying apparatus 100 lighter and comfortable in grasping the magnifying apparatus 100.

With reference to FIG. 3, the support 160 according to an exemplary embodiment includes a first support 161, a second support 162, and a third support 163. An upper end portion of the first support 161 is hinge-coupled at the other side of the bottom surface of the body 100a in the width direction such that the first support 161 is folded and unfolded. The first support 161 has the same height as that of the handle 200. Thus, as shown in FIG. 7(a), when the first support 161 is unfolded, the first support 161 fixes the magnifying apparatus 100 to the ground along with the handle 200. Through such a configuration, when the handle 200 is folded, it serves as a support, simplifying the configuration of the support (a first fixing process).

An upper end portion of the second support 162 is hinge-coupled to one side of the lower surface of the handle 200 in the width direction such that it is folded and unfolded. Also, an upper end portion of the third support 163 is hinge-coupled to the other side of the bottom surface of the body 100a in the width direction such that it is folded and unfolded. In this case, the third support 163 is configured such that a height thereof is equal to the sum of a height of the second support 162 and that of the handle 200. Thus, when the second support 162 and the third support 163 are unfolded, they fix the magnifying apparatus 100 to the ground as shown in FIG. 7(b) (a second fixing process).

Through the foregoing configuration, in an exemplary embodiment, when the body 100a is fixed to the ground, the height can be adjusted in two steps. In case of a general one-step support, when the magnifying power of a magnifier is desired to be reduced in a state in which the magnifier is tightly attached to the ground, the magnifier should be lifted to reduce the magnifying power thereof, and this is inconvenient for the user to actually use. Thus, in order to solve this problem, the two-step support is provided, and this tall support provides user convenience when the user wants to use the magnifier with low magnifying power. In this exemplary embodiment, the support 160 is described to have two steps, but it is obvious that the support 160 may be two or more steps.

The LED illumination unit 140 may be provided on the bottom surface of the body 100a. Specifically, the LED illumination unit 140 may be installed in the vicinity of the lens unit 110. This is to brightly illuminate a subject so that the lens unit 110 can easily obtain an image of the subject. As the LED illumination unit 140, a generally used LED may be employed. In this case, in order to operate the LED illumination unit 140 only when an image of a subject is captured in a close-up manner, the LED illumination unit 140 is controlled under the control of the arithmetic operation module 170. Thus, power consumption can be reduced and a limited usage time of the portable magnifying apparatus, which is a disadvantage of the portable magnifying apparatus, can be lengthened. Also, brightness may be adjusted by a distance measured by the distance sensor unit 120. To this end, a plurality of LED illumination units 140 may be provided, and the number of operated LED illumination unit 140 may be increased or decreased according to the distance.

The UI unit 150 is provided at the other side of the top surface of the body 100a in the length direction. The UI unit 150 is provided to be sloped toward the handle 200 at a certain angle with respect to the top surface of the body 100a. This is to allow the user to easily manipulate the UI unit 150 with his thumb when grasping the handle 200. The UI unit 150 receives a user input value through clicking of buttons and transfers the same to the arithmetic operation module 170 or the output unit 130.

A plurality of UI units may be provided on the body 100a in the width direction. For example, the UI unit 150 may be configured as a combination of first to fifth buttons.

The first button transfers an input value to the output unit 130 by clicking to change the color of an image output through the output unit 130.

The second button is configured in the form of a wheel button. The second button transfers an input value to the arithmetic operation module 170 such that magnifying power (zoom) of an image output through the output unit 130 can be adjusted. In this case, the second button in the form of a wheel button transfers the input value by rolling, and in this case, the magnifying power (zoom) can be more finely adjusted.

The third button transfers an input value to the arithmetic operation module 170 such that driving of the lens unit 110 can be converted into an auto-focus mode or a manual focus mode.

The fourth button transfers an input value to the output unit 130 by clicking to capture an image output through the output unit 130.

The fifth button transfers an input value to the arithmetic operation module 170 by clicking to turn on or off a power source of the magnifying apparatus.

The distance sensor unit 120 may have a measurement error in spite of the same model. A generation of a measurement error may lead to a degradation of picture quality of an image. Thus, the measurement error is required to be corrected. In order to correct the measurement correct, correction is made based on the one-step support supporting the body 100a through the first support 161 and the handle 200. The first support 161 and the handle 200 have the same height, so the first support 161 is unfolded and placed on the ground, and a distance is measured to correct the distance sensor table value calculated in the arithmetic operation module 170. The measured distance is compensated on the basis of the corrected value, thus providing a clear image with respect to auto-focusing.

The arithmetic operation module 170 may be installed in the form of a circuit within the body 100a. The arithmetic operation module 170 is a central processing module that controls an image sensor module, the distance sensor unit, the auto-focus driver, an image processing module, and a screen output unit. For example, the arithmetic operation module 170 receives an infrared signal from the distance sensor unit 120 to measure a distance to a subject, and drives the auto-focus driver 112 on the basis of the measured distance to adjust the focus of the auto-focus lens 111.

Figure 8:
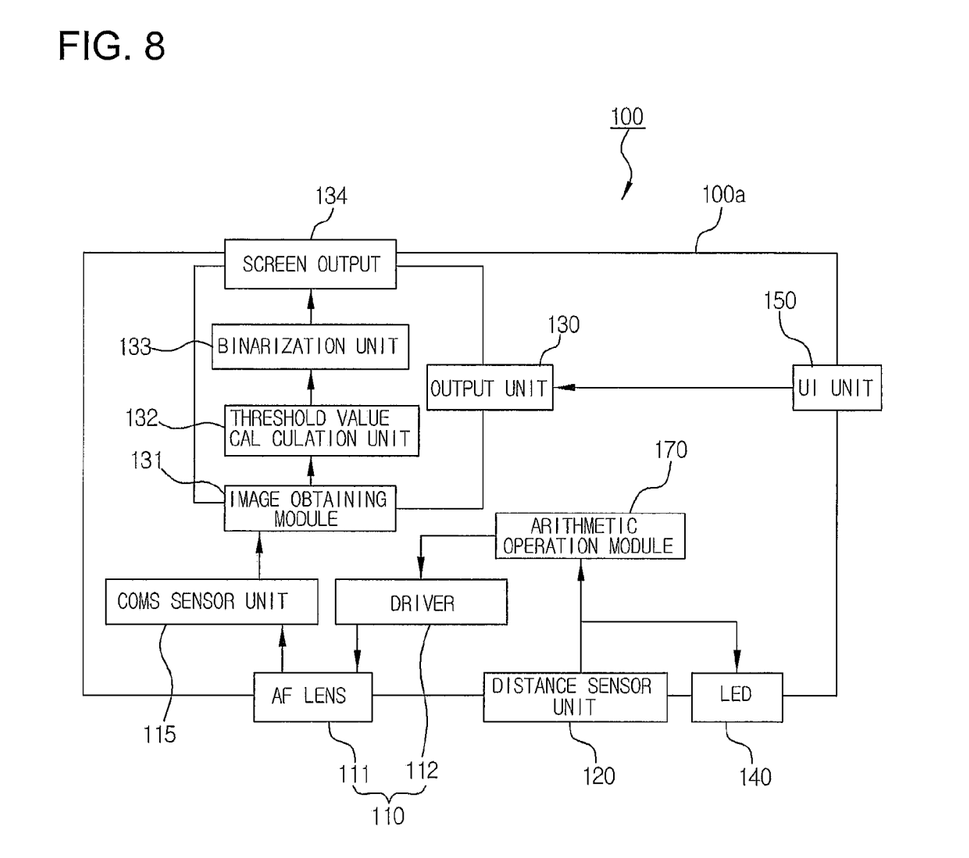
FIG. 8 is a schematic block diagram of the magnifying apparatus according to an exemplary embodiment.

With reference to FIG. 8, the output unit 130 includes an image obtaining module 131, a noise filter unit (not shown), a magnification filter unit (not shown), a color filter unit (not shown), a threshold value calculation unit 132, binarization unit 133, and a screen output unit 134.

The image obtaining module 131 stores image data transmitted through the CMOS sensor unit 115, and extracts a histogram for determining a threshold value required for a binarized image, to thus determine a threshold value.

The noise filter unit cancels Gaussian noise, and salt & pepper noise, i.e., general image noise, with respect to the image data. Also, in order to remove a fine tremor (or fine shaking) of the image data, the noise filter unit performs the following process.

The noise filter unit calculates a difference image between a block image with respect to image data of (N−1)th frame and a block image with respect to image data of Nth frame. The extent of motion according to a delay time between certain frames may be measured by using the calculated difference of the image. Accordingly, the noise filter unit may binarize the block image with respect to the image data of the (N−1)th frame and the block image with respect to the image data of the Nth frame to estimate a motion vector through XNOR operation, or the like, thereby measuring the extent of motion according to the delay time between the certain frames.

Thus, when the extent of motion is smaller than a predetermined value, the noise filter unit maintains the image data of the (N−1)th frame, and when the extent of motion is greater than the predetermined value, the noise filter unit outputs the image data of the Nth frame.

As mentioned above, when the extent of motion is smaller than the predetermined value, the noise filter unit maintains the image data of the (N−1)th frame, whereby a fine tremor phenomenon due to image binarization as explained hereafter can be removed.

Namely, the noise filter unit according to the exemplary embodiment is implemented to determine that there is no motion, specifically, when motion according to a delay time between certain frames is so fine that the extent of motion is smaller than the pre-set reference value.

The magnification filter unit serves to magnify the image data according to LCD resolution of the screen output unit 134. The magnification filter unit magnifies the image data through bilinear interpolation.

The color filter unit receives a user input value transferred from the UI unit 150 with respect to the image data, and applies brightness and high contrast.

The threshold value calculation unit 132 extracts a maximum pixel luminance value and a minimum pixel luminance value through a luminance signal of the image data, and calculates a threshold value through the maximum pixel luminance value and the minimum pixel luminance value. The threshold value may be implemented as an average value of the maximum pixel luminance value and the minimum pixel luminance value with respect to the image data of a corresponding frame.

Also, the threshold value calculation unit 132 may use a value obtained by applying a weight selectively received from the user to the calculated threshold value, as a threshold value for image binarization. In this case, brightness of a binarized image may be adjusted by the weight. Namely, brightness of the binarized image may be adjusted through a background color region of the binarized image that is varied according to the weight.

The binarization unit 133 generates a binarized image with respect to the image data on the basis of the threshold value. Namely, when a luminance value of a corresponding pixel is smaller than the threshold value, the binarization unit 133 implements the color of the corresponding pixel, as a background color, and when the luminance value of the corresponding pixel is greater than the threshold value, the binarization unit 133 may implement the color of the corresponding pixel, as a letter color.

The binarization unit 133 uses the background color and the letter color set according to an input value selected by the user through the UI unit 150, as colors for image binarization. For example, the background color and the letter color set according to a user selection input may be black and green, respectively. In such a case, the binarization unit 133 may convert the image data into a binarized image having the background color and the letter color as black and green, respectively, on the basis of the threshold value.

The screen output unit 134 serves to output the image data finally determined through the binarization unit 133. Thus, the screen output unit 134 is configured to be exposed from the other surface of the body 100a, and here, a general LCD panel may be applied as the screen output unit 134.

According to the foregoing configuration, in the exemplary embodiment, a clear binarized image can be provided through the output unit 130, eliminating a phenomenon in which an image viewed is bent or spread due to macular degeneration, nystagmus, or the like, and a fine tremor phenomenon due to image binarization, whereby user concentration and cognitive skill with respect to a subject or a visual medium can be improved.

Also, a user can magnify to view a book, a newspaper, a photograph, and the like, while on the move, and change the color of the binarized image according to his preference, so the magnifying apparatus can be used as a tool for the visually impaired to learn, rehabilitate, and access information. Also, a remote subject, as well as a nearby subject, can be clearly viewed through an auto-focus function without requiring a manipulation.

According to exemplary embodiments of the present invention, the portable magnifying apparatus configured as described above has advantages in that the angle of the handle can be adjusted in a direction parallel to the body, so the handle can provide an interface allowing both a right-hander and a left-hander to conveniently use the portable magnifying apparatus without causing strain to the wrist as well as serve as a support, and when buttons for executing functions are manipulated, the user can manipulate the buttons with his/her hand grasping the handle. Also, since the support is configured to have multiple steps to allow the user to view a clear image without a loss with respect to the original image, and inconvenience that the user should hold the portable magnifying apparatus with his hand to view a subject at a low magnifying power can be improved.

In addition, since the intensity of illumination of the illumination unit is automatically adjusted by determining whether to execute a close-up mode according to a distance, user convenience is provided by allowing the user to easily manipulate the handle. Also, since the illumination unit is controlled according to the height of the body, stable illumination can be provided and the intensity of illumination and operation of the illumination unit are automatically controlled.

Moreover, fixed focus, single auto-focus, and active auto-focus schemes are all applied during the use of writing, auto-focus fine adjustment, a general usage, and the like, thus enhancing user convenience, and in case of the active auto-focusing, constant and stable focusing can be provided without a user manipulation.

While the present invention has been shown and described in connection with the embodiments, it will be apparent to those skilled in the art that modifications and variations can be made without departing from the spirit and scope of the invention as defined by the appended claims.

What is claimed is:

1. A portable magnifying apparatus having a multi angular positioned handle, the apparatus comprising:
    a body;
    a lens unit installed on a bottom surface of the body and focused to capture an image of a nearby subject or a remote subject;
    a CMOS sensor unit provided within the body and converting image obtained through the lens unit into image data;
    an output unit installed on a top surface of the body, receiving the image data, and outputting the same; and
    a handle hinge-combined to the bottom surface of the body such that an angle thereof is adjusted in a direction parallel to the body,
    wherein, when the handle is folded to the body, the handle is fixed to one side of the bottom surface of the body in a width direction, a first support having a height corresponding to a thickness of the handle is provided at the other side of the body in the width direction, and the first support is hinge-coupled to the body such that it is unfolded and folded.

2. The portable magnifying apparatus of claim 1, wherein a second support is hinge-coupled to the handle such that it is folded to or unfolded from a lower surface of the handle, a third support is provided at the other side of the body in the width direction and has a height corresponding to the sum of the thickness of the handle and a height of the second support, and the third support is hinge-coupled to the body such that it is unfolded or folded.

3. The portable magnifying apparatus of claim 1, further comprising:
    a user interface (UI) unit provided at the other side of the body in the length direction and configured as a plurality of buttons for receiving a user input,
    wherein the UI unit is provided to be sloped toward the handle at a certain angle from a top surface of the body.

4. The portable magnifying apparatus of claim 1, wherein the output unit includes:
    an image obtaining module loading image data transmitted from the CMOS sensor unit to a memory;
    a threshold value calculation unit extracting a maximum pixel luminance value and a minimum pixel luminance value through a luminance signal of the image data, and calculating a threshold value through the maximum pixel luminance value and the minimum pixel luminance value;
    a binarization unit generating a binarized image with respect to the image data on the basis of the threshold value; and
    a screen output unit outputting the binarized image.

5. The portable magnifying apparatus of claim 1, further comprising:
    a battery for supplying power,
    wherein the battery is embedded in the handle.

* * * * *